Oct. 29, 1968   W. C. DAILY   3,407,963
METHOD AND APPARATUS FOR FEEDING
NESTED ARTICLES FROM A MAGAZINE
Filed July 13, 1966   8 Sheets-Sheet 8
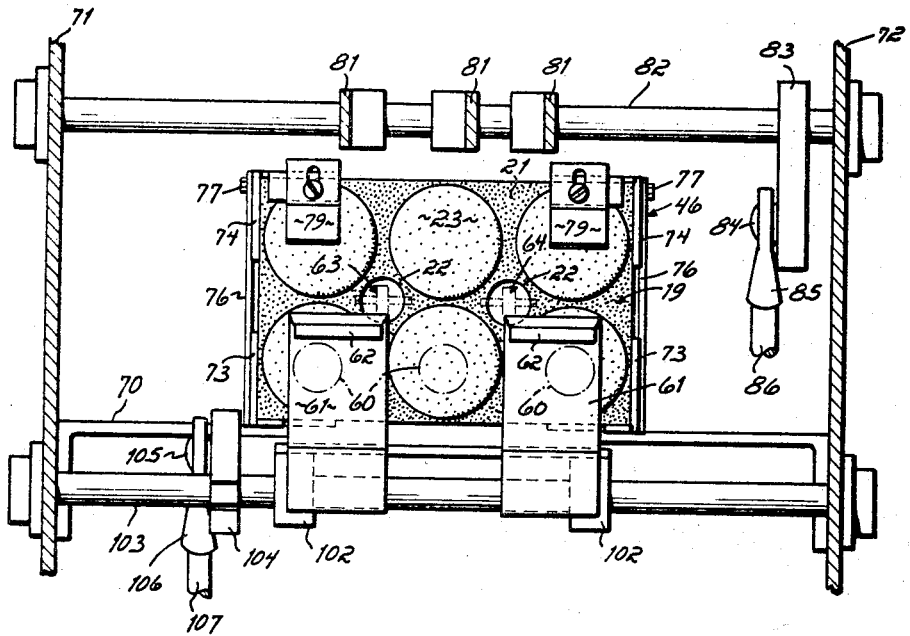
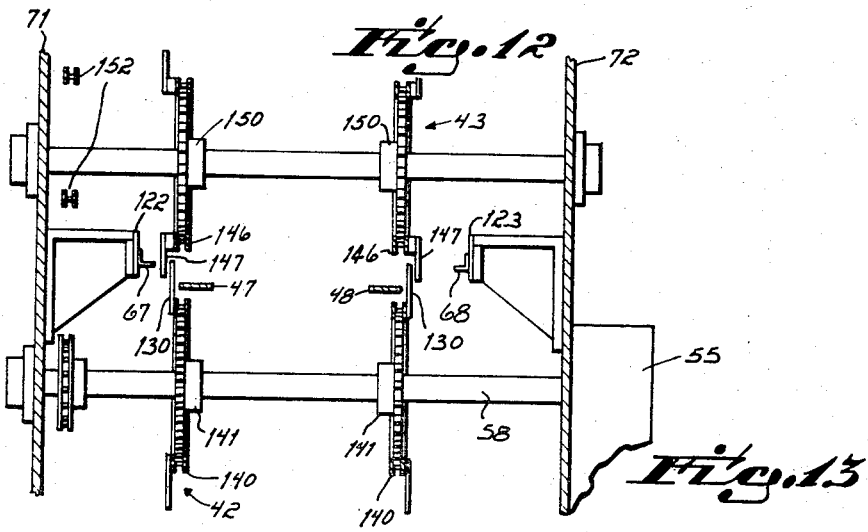
INVENTOR
William C. Daily
BY
Wood, Herron & Evans
ATTORNEYS 3,407,963
METHOD AND APPARATUS FOR FEEDING NESTED ARTICLES FROM A MAGAZINE
William C. Daily, Covington, Ky., assignor to R. A. Jones and Company, Inc., Covington, Ky., a corporation of Kentucky
Filed July 13, 1966, Ser. No. 564,906
7 Claims. (Cl. 221—36)

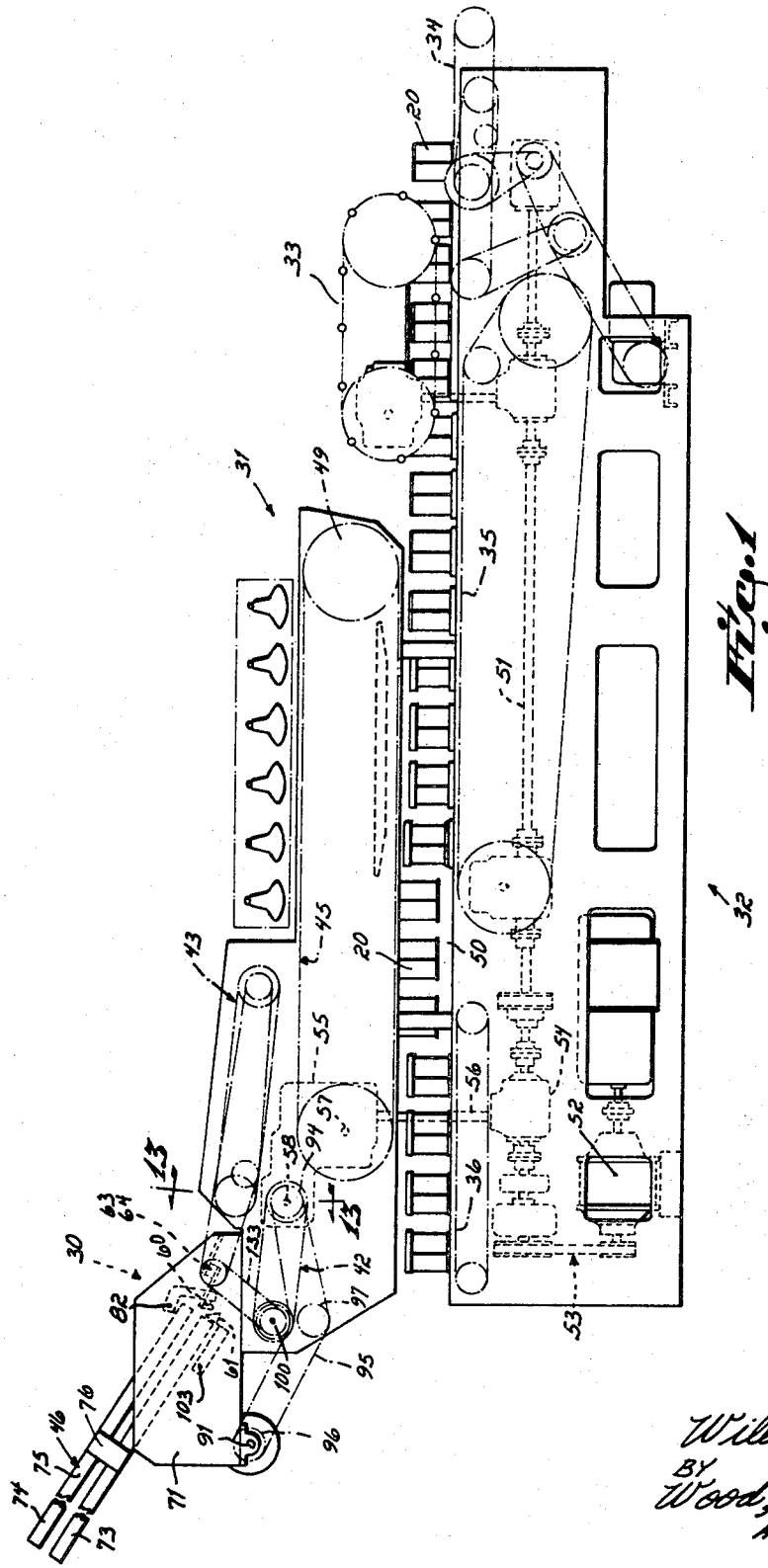

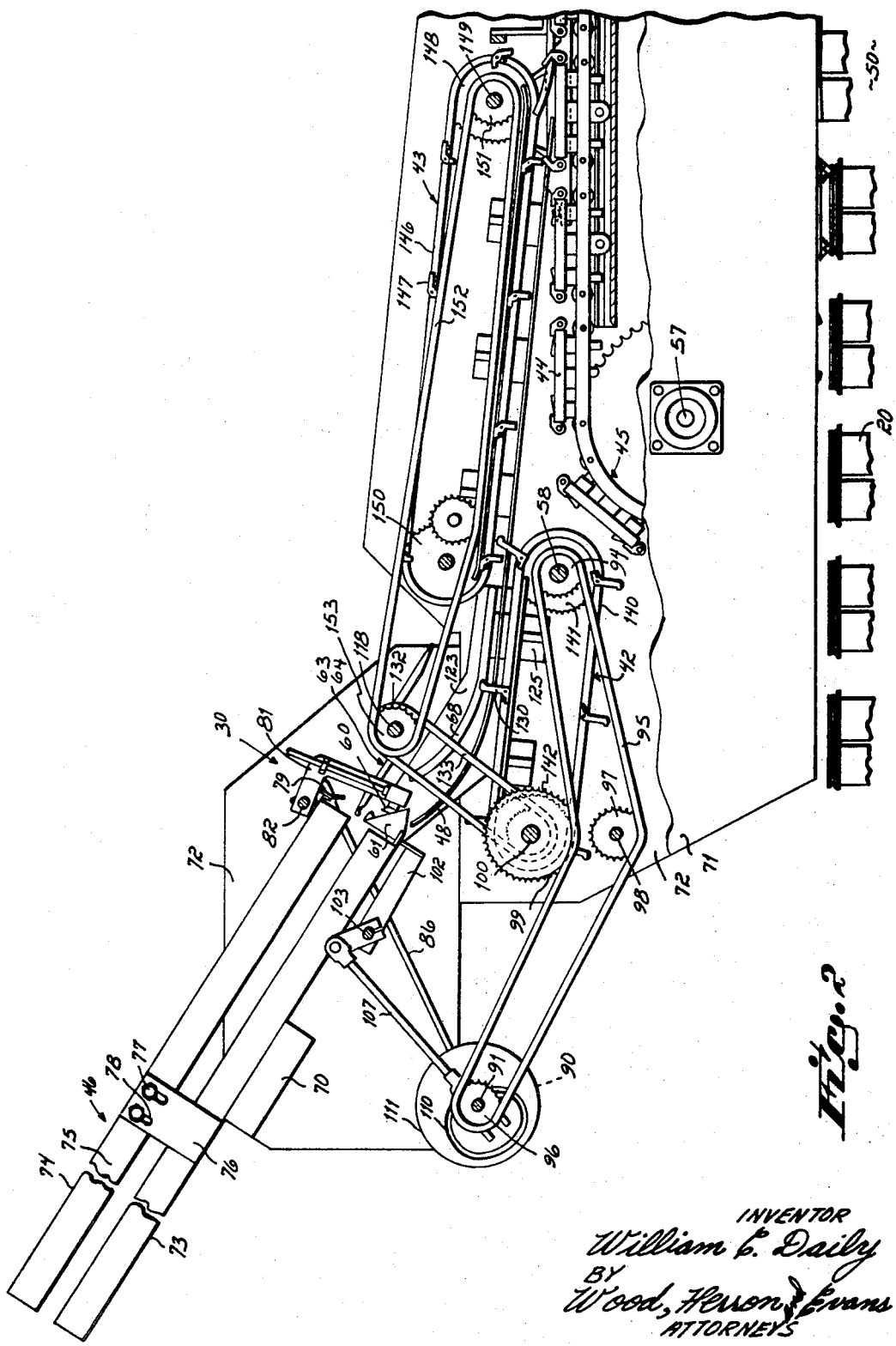

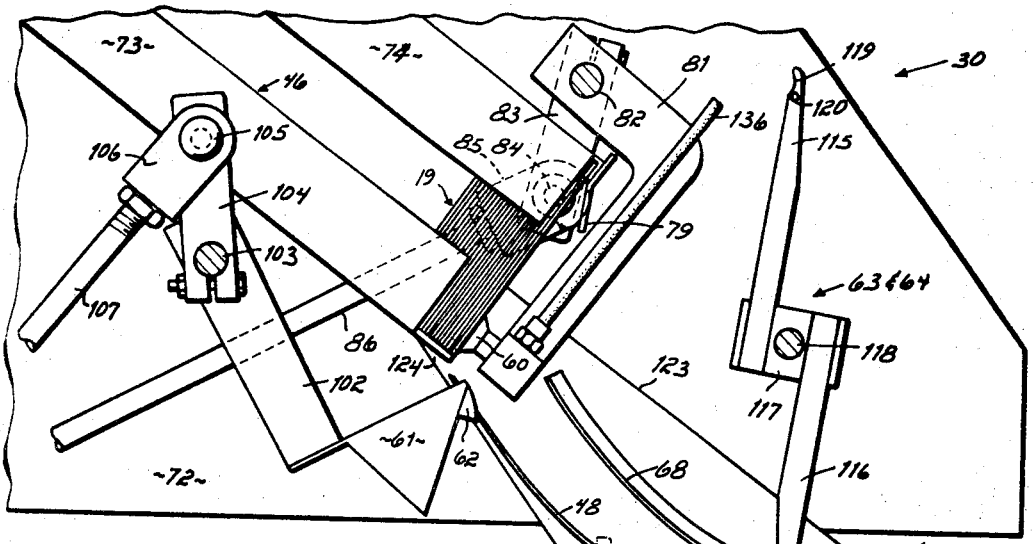
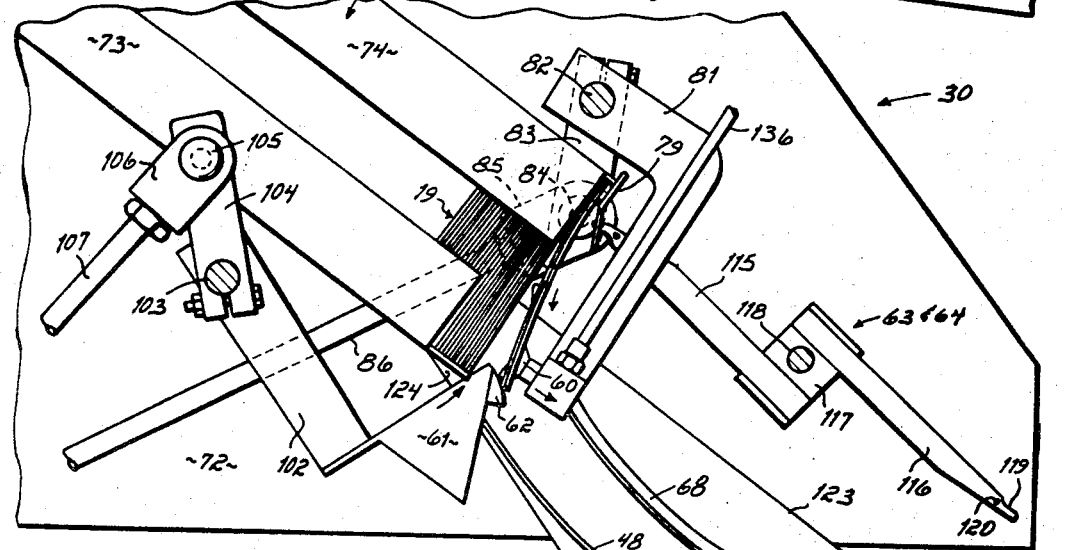

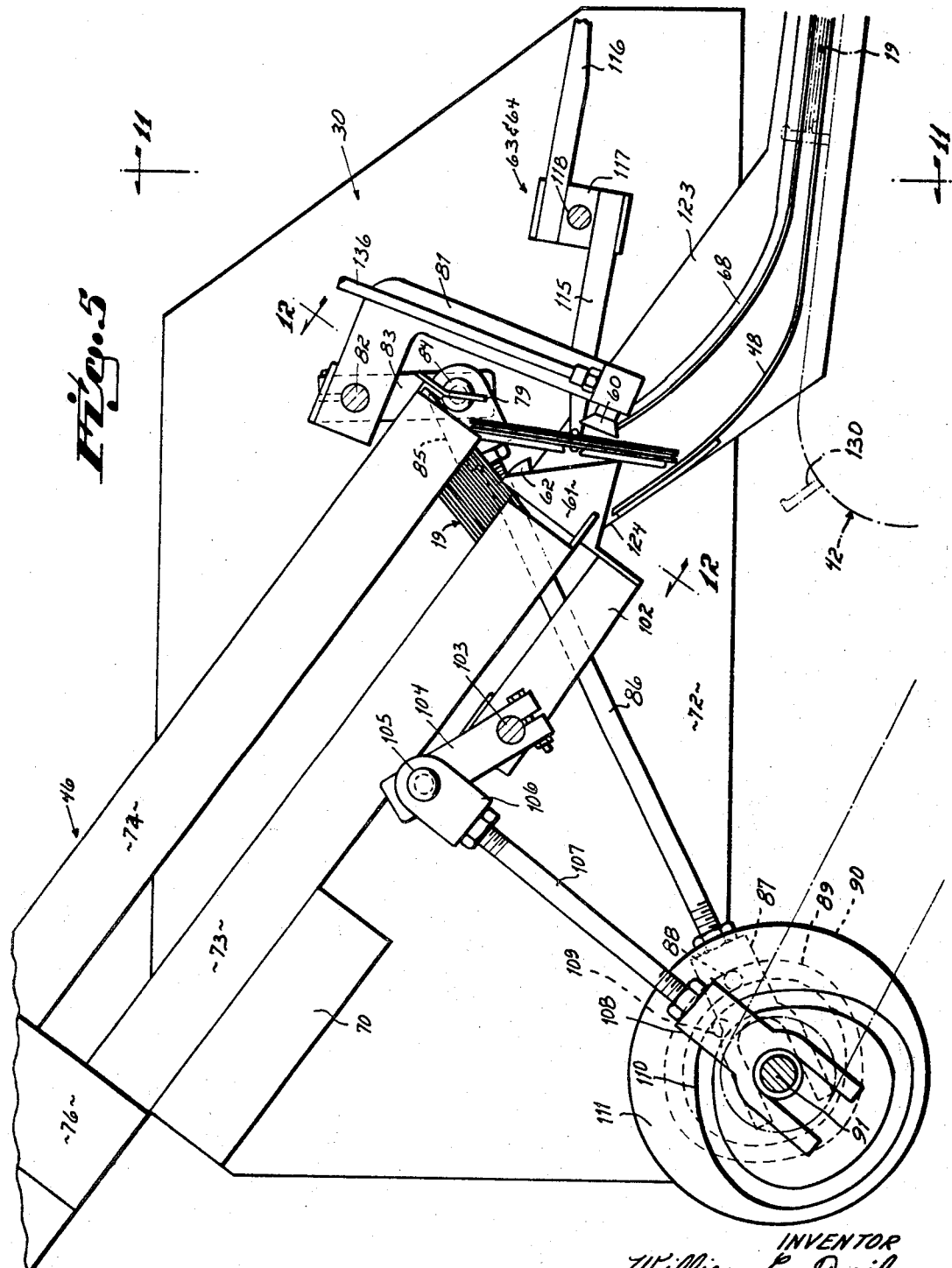

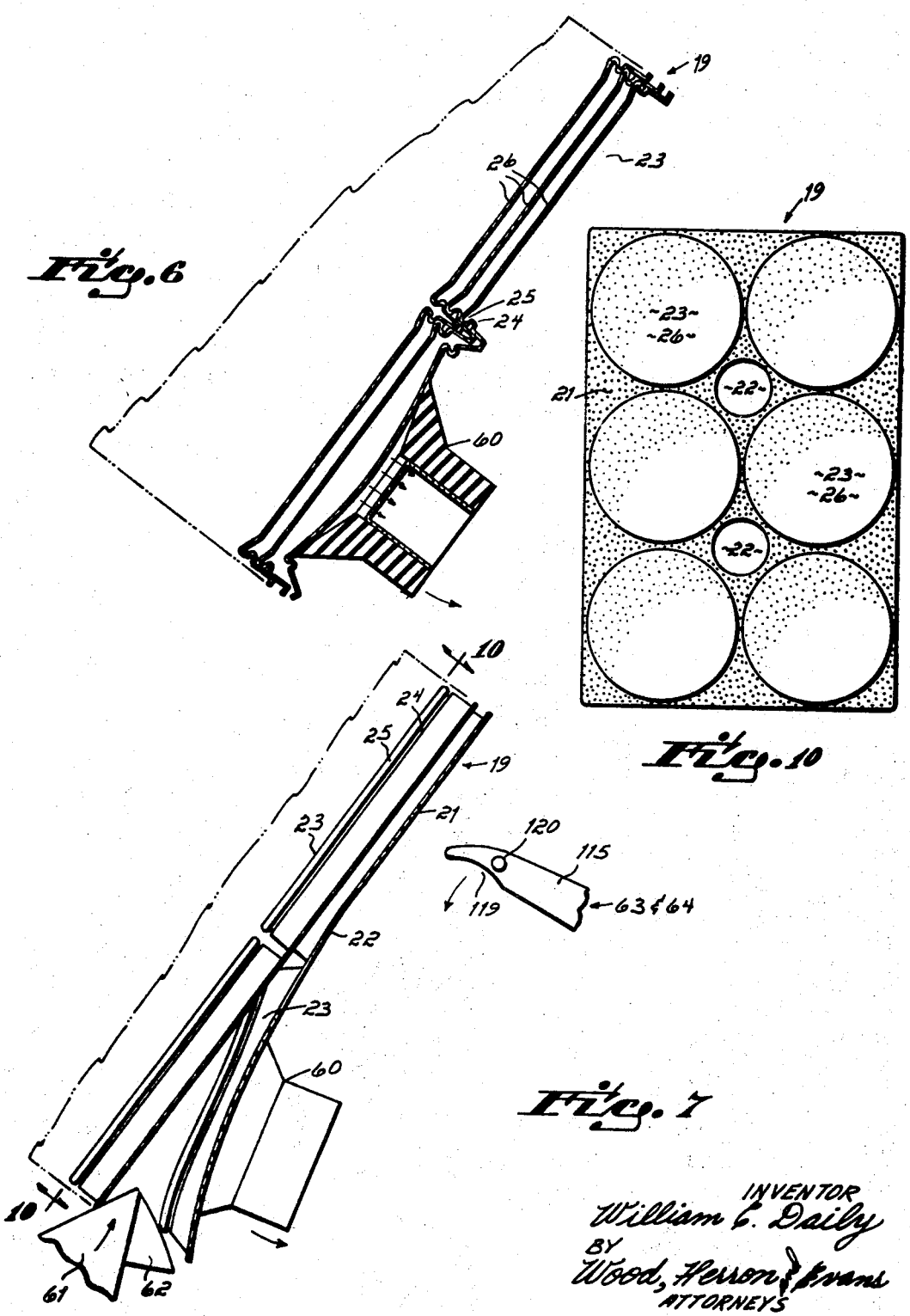

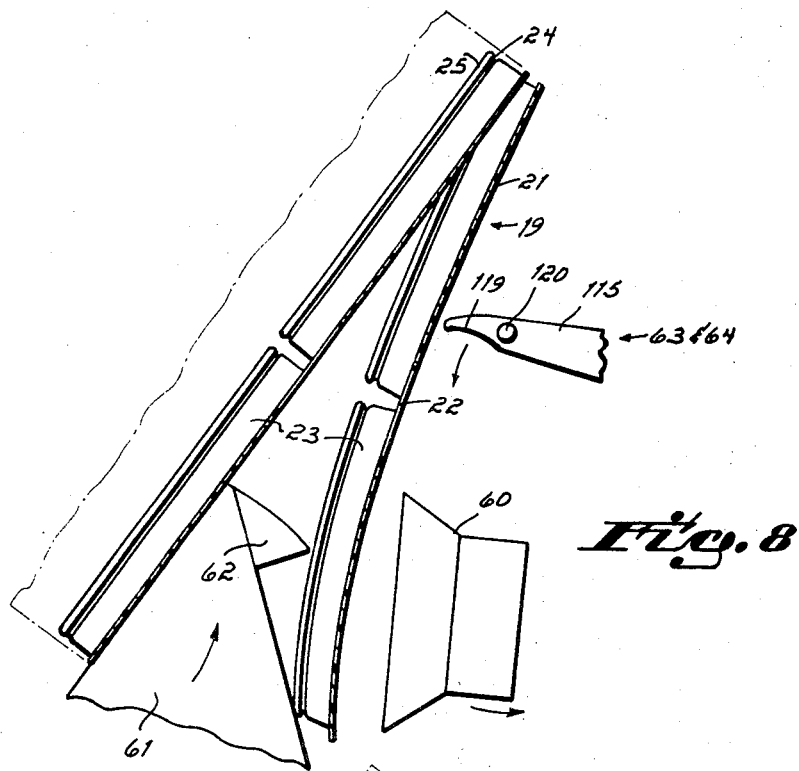
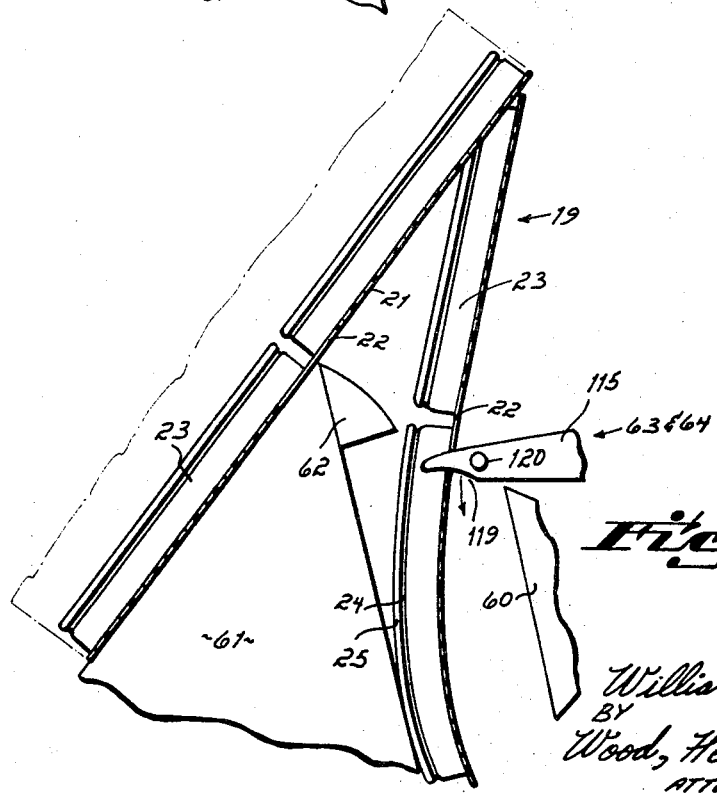

ABSTRACT OF THE DISCLOSURE

A method and apparatus for sequentially feeding generally planar multiple can carriers out of a magazine onto a conveyor. Each of the carriers is made from a plastic material and is provided with a plurality of pockets or recesses adapted to receive and embracingly engage portions of the can side walls in the vicinity of the can chimes such that the cans may be transported in the carriers while suspended therefrom. The carriers are stored in the magazine with the pockets of each carrier nested within the pockets of the next adjacent carrier. The apparatus for removing the nested carriers from the magazine comprises a plurality of movable suction cups engageable with pockets of the endmost carrier in the magazine and operable to pull some of the pockets of this carrier out of engagement with the pockets of the next adjacent carrier while leaving other pockets nested within the pocket of this adjacent carrier. A separator plate is then inserted between the partially separated carriers so as to completely separate them after which movable ejection fingers are engageable with finger holes of the carriers to complete the extraction of the endmost carrier from the magazine.

---

Figure 11:
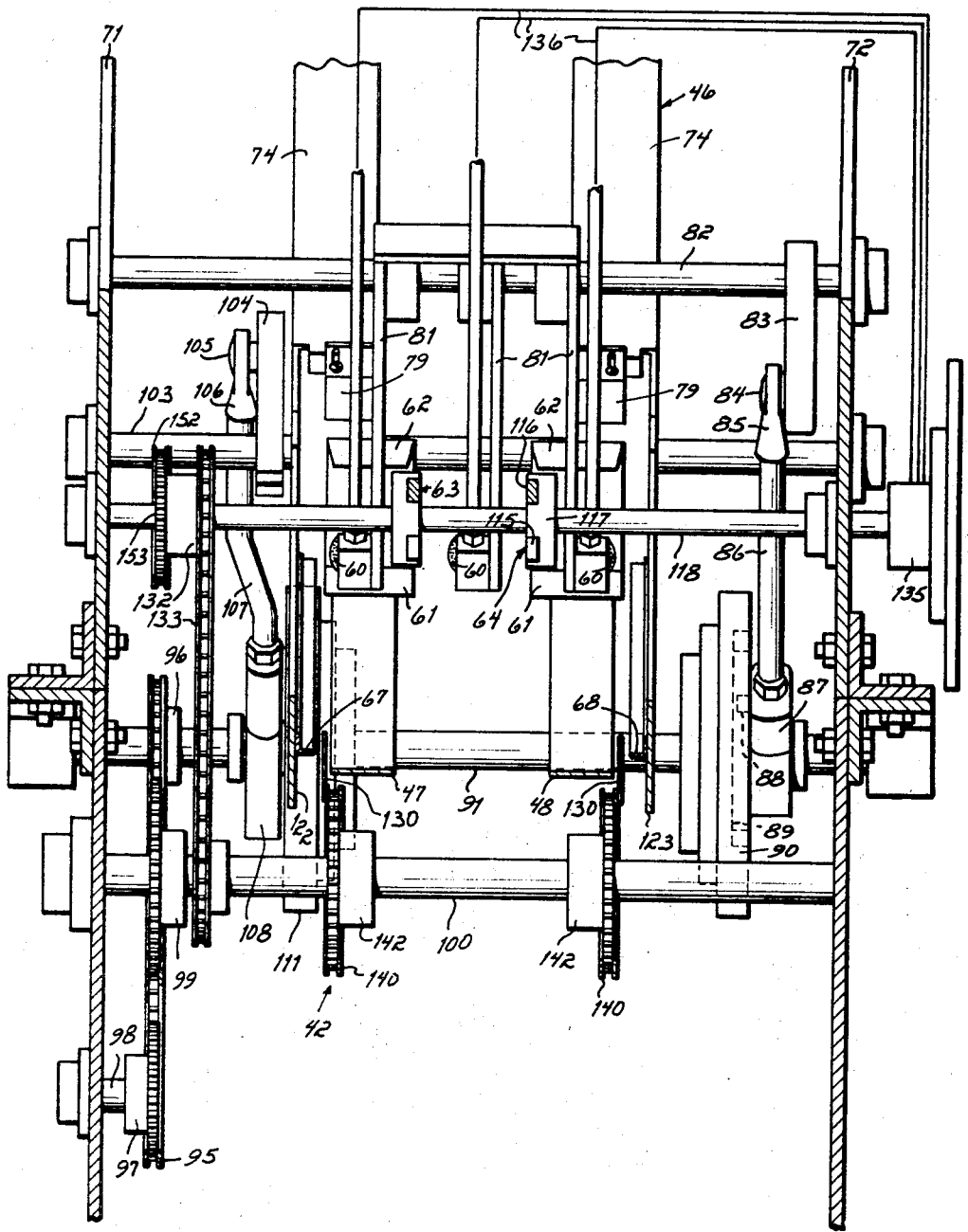

This invention relates to an improved feeder mechanism, and more particularly to an improved feeder for sequentially feeding generally planar, pocket defining article carriers from a magazine.

Carriers of the type adapted to be used in the feeder mechanism of this invention or in the practice of the method of this invention are disclosed in Patent No. 3,224,575 of Carlton L. Whiteford or in Patent No. 3,224,576 of Carlton L. Whiteford. Generally, these carriers may be described as packaging devices for transporting cans which comprise a sheet or web of resilient plastic or thermoplastic material having a plurality of resilient container receiving pockets formed integral with the web and projecting from one side thereof. Each pocket has a constricted entrance portion which may be cylindrical or other shape, depending upon the cross sectional configuration of the containers to be packaged. The peripheral dimensions of the entrance portion of the container receiving pockets is less than the peripheral dimensions of the container such that the peripheral entrance portions of the pockets may be stretched and placed in tension when a container is forced into one end of the pocket. The result is a package consisting of a cover sheet having formed therein a plurality of separated can receptive pockets each provided with a tension band securely and snugly engaging an annular zone of the exterior can wall beneath its chime or bead so as to permit suspension of the cans from the carrier without danger of dropping during transportation, handling and storage.

It has been one objective of this invention to provide an improved magazine feed for sequentially feeding carriers of the type described hereinabove from a stack.

This invention is an improvement upon the method and apparatus disclosed in application Ser. No. 389,972 of Julian A. Dieter et al., filed Aug. 17, 1964, and assigned to the assignee of this invention.

The machine disclosed in the above identified application upon which this invention is an improvement includes a carrier feeder mechanism for sequentially feeding carriers from a magazine. This feeder utilizes vertically and laterally movable fingers mounted beneath the magazine and movable through carrier finger holes to engage the last carrier or the bottom carrier in the magazine and extract it downwardly. While this earlier feeder is fully operative and does a fine job of sequentially feeding the carries from the magazine, it requires the carriers to be properly and loosely stacked within the magazine. However, it is the practice in the industry to ship the preshaped carriers to the brewery or bottling factory where the carriers are assembled with the cans in a tightly compressed bundle. When tightly compressed, the carriers are prone to become nested and interlocked with the can engaging portions or pockets of one carrier inserted through and interlocked beneath or within the pocket of the adjacent carrier. When thus interlocked, the feeder mechanism disclosed in the above identified application often feeds two carriers simultaneously from the magazine with the result that the packaging machine jams and does not operate properly.

It has therefore been another objective of this invention to provide a doubles prevention feeder mechanism which is operative to sequentially feed carriers of the type described hereinabove one at a time from a magazine even though the carriers may be nested one within the other and interlocked therein.

Generally, the feeder mechanism of this invention may be envisioned as embodying a sloping gravity feed magazine through which carriers are fed to a feeder. The magazine defines approximately a 30° angle relative to a horizontal plane so that the carriers within the magazine are located upon approximately a 60° angle or slope relative to a horizontal plane through the carriers.

In order to extract a carrier from the magazine, the feeder of this invention comprises suction cups operative to engage the lowermost row of pockets of the first carrier in the magazine and pull or bow the center portion of each pocket inwardly and thus out of engagement with the corresponding pocket of the next adjacent carrier in the magazine. With the lower row of pockets pulled inwardly or collapsed and out of engagement with the pockets of the carrier immediately above, the suction cups are moved rearwardly so as to pull the lower portion of the first carrier in the magazine forwardly out of the magazine, causing it to flex about its horizontal center line. At this point, the lower portion of the first carrier in the magazine is disengaged from the carrier immediately behind it while the upper row of pockets remains nested within the corresponding pockets of the following carrier. A stripper plate or spade is then moved vertically into the gap now defined between the lower portion of the first carrier in the magazine and the carrier immediately behind it. This spade moves upwardly to force the first carrier away from the following carrier in the magazine and to dislodge or disengage the nested upper row of pockets of the first carrier from the upper pockets of the following carrier. As soon as the stripper plate or spade has entered between the first carrier in the stack and the following carrier, the suction is released from the suction cups and they are moved forwardly away from the stack of carriers in the magazine. When the spade hos completely disengaged all of the pockets of the first carrier in the stack from the pockets of the following carrier, rotatable extractor fingers enter into finger holes of the first carrier in the stack and force it downwardly out of the magazine. The carrier is then moved through a pair of guide rails into a conveyor mechanism which conveys it to a platen within which it is clamped for insertion of cans into the carrier.

The primary advantage of the feeder mechanism described hereinabove is that it completely eliminates the feeding of doubles from the magazine.

These and other objects and advantages of this invention will become more readily apparent from the following description of the drawings in which FIGURE 1 is a side elevational view of a packaging machine incorporating the feeder method and apparatus of this invention, FIGURE 2 is an enlarged longitudinal cross-sectional view of the feeder portion of the machine illustrated in FIGURE 1, FIGURES 3, 4 and 5 are enlarged side elevational views of the feeder mechanism in sequential operative positions during the removal of a carrier from the magazine, FIGURES 6, 7, 8 and 9 are enlarged cross-sectional views taken through the carrier to more clearly illustrate the sequential steps in the removal of a carrier, FIGURE 10 is a top elevational view of a carrier taken along line 10—10 of FIGURE 7, FIGURE 11 is a cross-sectional view taken along line 11—11 of FIGURE 5, FIGURE 12 is a cross-sectional view taken along line 12—12 of FIGURE 5, and FIGURE 13 is a cross-sectional view taken along line 13—13 of FIGURE 1.

Referring first to FIGURE 10, there is illustrated one preferred embodiment of a carrier 19 of the general type adapted to be utilized in the practice of the invention of this application. This carrier 19 is essentially an integral plastic packaging device for containing six beaded cans 20 in a two deep, three abreast relationship. It comprises a web 21 having a pair of finger holes 22, one centered on each end between the middle and end pairs of can receiving pockets 23. The pockets 23 are formed integral with the web 21 by a conventional heat and pressure-forming process. As best shown in FIGURE 6, each pocket 23 has a cylindrical constricted entrance portion 24 of a smaller diameter than a can 20 which it is to contain. Contiguous with the entrance portion 24 of the pocket 23 is a larger diameter can chime receiving section 25 within which the bead or chime of a can 20 is to be received. A cover section 26 encloses the end of the pocket 23 to surmount a can contained in the pocket.

As best shown in FIGURE 6, the carriers are stored in the magazine in nested relation with the pockets 23 of the carriers 20 nested within the pockets of the adjacent carrier. This nesting is necessary for purposes of shipping and storage to minimize shipping and storage bulk. However, because of the flexibility of the plastic carriers and the degree of compression to which they are subjected for shipment, a chime receiving section 25 of a pocket often is forced beyond the restricted entrance portion 24 of an adjacent pocket and into another chime receiving section to interlock two adjacent carriers. As a consequence, two or more adjacent carriers are often locked together with the result that separation is a problem for purposes of mechanically feeding single carriers from a magazine. It is this problem which the feeding mechanism of this invention is primarily designed to overcome.

*General description*

Referring to FIGURE 1, the invention of this application is illustrated as applied to a packaging machine of the type disclosed in the patent application of Julian A. Dieter et al., entitled "Packaging Method and Apparatus," Ser. No. 389,972, filed Aug. 17, 1964, and assigned to the assignee of this application. Except for the different magazine feed, these machines are identical and therefore the packaging portion of the machine will not be described in detail in this application.

This machine comprises a magazine feed indicated generally by the numeral 30, an upper carrier flight 31, a lower can flight 32, and a can grouping sweep bar system 33. The can flight 32 is operative to feed the cans into the machine and to feed the packaged cans out of the machine. It consists of three main belt or conveyor sections; an infeed can conveyor 34, a can platen conveyor 35, and a discharge conveyor 36. Cooperable with the can infeed conveyor 34 is the sweep bar system 33 which is mounted above the lower can flight 32 and is operative to separate the rows of cans into groups of six.

As may best be seen in FIGURE 2, the upper carrier flight 31 consists of a carrier transfer conveyor 42, a carrier loading conveyor 43 and a carrier platen conveyor 45. Carriers fed from a magazine 46 are sequentially deposited upon the transfer conveyor 42 which then moves the carriers along rails 47, 48 into the path of the loading conveyor 43. This latter conveyor 43 then pushes the carriers into one of a plurality of carrier platens 44 carried upon the carrier conveyor 45. When placed in the platens 44, the carriers 19 are upside down and in this position are securely clamped therein. The carrier platen conveyor 45 conveys the carriers around a sprocket 49 and inverts the carriers to position them for reception of the cans into the open pockets thereof. The carriers are then moved into pressure engagement with the cans, and while the pressure engagement is maintained, the bottoms of the cans are wobbled or oscillated so as to tilt the tops of the cans relative to the planes of configuration of the pockets. This oscillation results in the chimes of the cans 20 being progressively inserted beyond the constricted entrance portions 24 of the carrier pockets and into the chime receiving sections 25. Once inserted into the carrier, the cans are transported across an open gap 50 in the conveyors while suspended from the carrier and are deposited upon the discharge belt 36.

The conveyors 34, 35, 36, and the sweep bar system 33 of the lower flight 32 are all driven from a common timer or main shaft 51, which is in turn driven by an electric motor 52 through conventional belts and pulleys 53. The magazine feed 30 and the conveyors 42, 43 and 45 of the upper carrier flight 31 are similarly all driven from the timer shaft 51 through a pair of gear boxes 54 and 55 and their associated output shafts 56, 57 and 58.

*Feeder mechanism generally*

Referring first to FIGURES 1 and 2, it will be seen that the magazine 46 through which carriers are gravity fed to the magazine feed mechanism 30 is angulated at approximately a 30° angle relative to a horizontal plane so that the carriers, when delivered to the feeder mechanism are angulated and define approximately a 60° angle relative to a horizontal plane through the carriers. This angulation of the carriers relative to a horizontal plane may best be seen in FIGURES 3 and 4. The carriers are placed in the magazine in nested relationship with the pockets facing downwardly and forwardly relative to the direction of movement of the carriers in the magazine. When stacked in the magazine, the carriers are nested one within the other, in the relationship in which they are shipped to a packager, such as a brewery, from the carrier manufacturer. In order to minimize shipping costs, the manufacturer places the carrier in this relationship and compresses the carriers of the stack at tightly as possible. As a consequence, the constricted entrance portion 24 of the pockets 23 of the carriers often becomes interlocked with the chime receiving section 25 of the pocket interfitted into the chime receiving pocket of the preceding carrier in the stack. When this occurs, it is difficult to extract the first carrier in the stack without also extracting the carrier to which it is interlocked.

To extract the first carrier from the magazine, three oscillatable suction cups 60 are mounted for movement into engagement with the three lower pockets of the first or lowermost carrier in the magazine. As may be seen in FIGURE 12, the suction cups 60 are mounted upon an oscillatable arm which enables the cups to be moved forwardly into engagement with the first carrier in the stack. Prior to engagement of the suction cups 60 with the pockets, a vacuum is applied to the cups as indicated diagrammatically in FIGURE 6. The vacuum results in the cover section 26 of each of the three lower pockets in the first carrier being deformed or bowed into a concave configuration so that the chime receiving section 25 of the three lower pockets of the first carrier is pulled inwardly away from the constricted entrance portion 24 of the next adjacent carrier in the stack. This enables the lower half or the three bottom pockets of the first carrier in the stack to be pulled rearwardly upon rearward oscillatory movement of the suction cups. This rearward movement of the suction cups occurs while the vacuum is maintained so that the first carrier in the stack flexes about its horizontal center line into the position illustrated in FIGURES 4 and 7 in which the upper half or the three top pockets of the first carrier remains nested within the pockets of the following adjacent carrier.

To complete the separation of the first carrier in the stack from the following carrier, a spade 61 is movable upwardly between the now flexed first carrier in the stack and the second carrier. This spade or stripper plate has an enlarged dimple 62 on its top surface which, as it enters between the two carriers, forces the second and all of the other carriers in the stack to move rearwardly while simultaneously forcing the first carrier in the stack to move forwardly. Thus, the first carrier is stripped away and moved out of engagement with the following second carrier in the stack.

When the first carrier has been completely moved out of engagement with the second carrier in the stack, rotatable feed fingers 63, 64 enter into the finger holes 22 of the first carrier 19 in the stack. As soon as the feed fingers 63, 64 enter into the finger holes of the carrier, the vacuum is released to the suction cups 60 and their rearward movement is continued so that they move into the position illustrated in FIGURE 5 out of engagement with the carrier. Continued rotation of the feed fingers results in the fingers pushing the carrier downwardly between the arcuate guide or support rails 47, 48, 67, 68. These guide rails then change the direction of movement of the carrier from a generally vertical to horizontal movement so that the carriers are placed upon the transfer conveyor 42. Continued rotation of the feed fingers 63, 64 results in upward movement in which the fingers are withdrawn from the finger holes of the carrier and the carrier is left deposited upon the transfer conveyor from whence it is moved forwardly into the packaging machine.

*Magazine*

As is best shown in FIGURES 2 and 12, the magazine 46 is supported upon a transverse frame bar 70 which extends between frame side plates 71 and 72. This bar 70 adjustably supports a pair of lower right-angle posts 73 which are bolted thereto. A pair of upper right angle posts 74 having vertically depending flanges 75 are adjustably secured to plates 76 by bolts 77 passing through slot 78 in the flanges 75. The lower angle brackets 73 and upper angle brackets 74 thus define a variable dimension rectangular trackway for the carriers. By transversely shifting the upper and lower angle plates 73 and 74 relative to the frame 70, and by vertically moving the upper angle brackets 74 with respect to the plates 76, the magazine may be adjusted to accommodate various size carriers. The carriers are fed by gravity through the magazine and at the bottom thereof rests against the vertically movable separator spades 61 and a pair of depending stops 79 welded or otherwise secured to the lower end of the upper set of right-angle bars or posts 74.

*Suction cup mechanism*

Each of the three suction cups 60 is mounted for oscillatory movement upon one of three inverted L-shaped brackets 81. These brackets 81 are nonrotatably secured to a shaft 82 which is journaled for rotation in side walls 71, 72. Rotation of the shaft 82 is controlled by a depending link 83 which is also nonrotatably keyed thereto and is connected by a pivot shaft 84 to a yoke 85 of a connecting arm 86. The lower end of the connecting arm 86 is attached by a yoke 87 to a cam follower 88. This follower 88 is movable within a trackway 89 of a cam which is nonrotatably secured to a shaft 91. The yoke 87 straddles the shaft 91 so as to permit only axial movement of the rod 86 as the cam follower 88 travels within the eccentric cam track 89.

Rotational movement of the shaft 91 and thus the cam 69 is derived from the output shaft 58 of the gear box 55, which is in turn driven from the main drive shaft or timer shaft 51 of the machine.

As may be best seen in FIGURE 13, the gear box 55 is bolted to the side plate 72 and has its output shaft 58 extending transversely through a journal block on the side plate 72 and terminating in a journal block on the side plate 71. A sprocket 94 is nonrotatably keyed to the shaft 58 adjacent the side plate 71. This sprocket 94 is operative to drive the cam shaft 91 through an endless chain 95 and driven sprocket 96 secured to the cam shaft 91. Between the sprockets 94 and 96, the chain 95 passes over an idler sprocket 97 mounted upon a stub shaft 98 and over a driven sprocket 99 secured to a conveyor drive shaft 100.

*Separator spade*

As may be seen most clearly in FIGURES 3, 4 and 5, the separator spade 61 is generally triangular when viewed in vertical side elevation and is provided with an enlarged rounded stripper element 62 at the top. The bottom of the separator spade 61 is connected by a lever arm 102 to a shaft 103 which is journaled in side plates 71 and 72. The shaft 103 nonrotatably supports one end of a link 104, the opposite end of which is connected by a pivot shaft 105 to a yoke 106 of a connecting rod 107. The lower end of the connecting rod 107 is attached to a yoke 108 upon which is mounted a cam follower 109 that cooperates with a trackway 110 of a separator spade cam 111 nonrotatably secured to the shaft 91. To limit movement of the rod in an axial direction, the yoke 108 straddles the shaft 91 and thus serves as a guide to preclude lateral movement of the rod. Rotational movement of the shaft 91 and thus the attached cam 111 results in axial movement of the rod 107 as a consequence of the cam follower 109 following the eccentric path of the cam track 110.

*Feed fingers*

To complete the extraction of the carrier from the magazine, rotatable feed finger assemblies 63, 64 are engageable with the carrier. Each feed finger assembly 63, 64 comprises a pair of diametrically opposed fingers 115, 116 secured to a rotatable mounting block 117. The mounting block 117 is nonrotatably secured to a shaft 118 such that rotation of the shaft results in rotation of the opposed feed fingers 115, 116. At the end of each finger 115, 116 is an arcuate recess 119 and a transverse stop pin 120 operative to limit the extent of insertion of the fingers 115, 116 into the finger holes 22 of the carrier.

As may be seen most clearly in FIGURES 2, 5, 11 and 13, the feed fingers 115, 116 cooperate with the pair of lower guide rails 47, 48 and the pair of upper guide rails 67, 68 in the extraction of a carrier from the magazine and placement of the carrier on the transverse conveyor 42. Both the upper and lower pairs of guide rails are supported upon a spaced pair of vertical support plates 122, 123 which are spaced inwardly from the machine frame side plates 71 and 72, respectively. The rearward end 124 of each of these plates 122, 123 is secured to the magazine and the opposite forward end is fixedly secured to a frame crossbar 125. The rearward end of each of the guide rails 47, 48 is secured to the plates 122, 123, respectively, and is spaced therefrom by spacer brackets 126 which are welded to the guide rails 47, 48 and the vertical support plates 122, 123. At their lower or downstream end, the lower support rails 47, 48 are fixedly attached to the transverse frame bar 125. As may be seen most clearly in FIGURES 3 and 4, the rearward or upstream end of the guide rails is curved so that it acts as a guide in the transfer of the carriers from the generally vertical plane in which they are stored in the magazine to the horizontal plane in which they are placed upon the transfer conveyor 42.

The upper pair of guide rails 67, 68 is welded or otherwise secured directly to the vertical support 122 and 123, respectively. These upper guide rails cooperate with the lower guide rails in confining the carrier during its transfer on the feed fingers between the magazine and the transfer conveyor 42. After the carrier has been deposited in front of a lug 130 of the transfer conveyor 42, the feed fingers 115, 116 continue their rotational movement in the counterclockwise direction as viewed in FIGURE 3 so that the fingers are withdrawn from the finger holes of the carrier. Upon upward movement of the fingers relative to the conveyor, the upper guide rails 67, 68 hold the carrier down so that the carrier is left deposited upon the lower guide rails in a position to be engaged and pushed forwardly by the lugs 130 of the transfer conveyor 42.

The rotation of the feed fingers 115, 116 is effected by rotation of the shaft 118 to which the finger supporting block 117 is nonrotatably keyed. As may be seen in FIGURE 11, this shaft 118 extends between and is rotatably journaled within the frame side plates 71, 72. The shaft 118 is rotated by a drive from the sprocket 132 to the shaft 100 which rotatably drives the shaft 118 through a chain and sprocket indicated generally by the numeral 133.

Mounted upon the end of the feed finger control shaft 118 is a suction control valve 135. This valve is connected through three conduits 136 to the three suction cups 60 mounted upon the oscillatable control arm 81. The valve 135 is a conventional rotary cutoff valve operative to supply vacuum to the suction cups and to open the suction cups to atmospheric pressure during each rotational cycle of the shaft 118. Thus, the application of a vacuum and atmospheric pressure to the suction cups is synchronized with the movement of the feed fingers 115, 116 and with the movement of the spade 61 and suction cups 60 as a consequence of all of these movements being mechanically interconnected to the main drive shaft 51.

*Carrier feed conveyors*

Referring to FIGURES 2, 9 and 11, it will be seen that carriers are conveyed forwardly along the lower guide rails 47, 48 by the transfer conveyor 42. This conveyor 42 comprises a pair of endless chains 140 which are driven by a pair of sprockets 141 keyed to the output shaft 58. Upstream of the shaft 58, the chains 140 pass over a pair of idler sprockets 142 rotatably journaled upon the shaft 100. The chains 140 carry a plurality of spaced pusher lugs 130 operative to engage the trailing edge of the carriers located upon the guide rails 47, 48 and push the carriers forwardly.

A second intermediate conveyor or carrier loading conveyor 43 is located above and immediately downstream from the transfer conveyor 42. This conveyor 43 comprises a pair of endless chains 146 having spaced pusher lugs 147 mounted thereon. As may be best seen in FIGURES 2 and 11, the pusher lugs 130 of conveyor 42 are transversely spaced from the vertical plane of the pusher lugs 147 on conveyor 43 so that there is no interference between the two. The chains 146 pass around and are driven from a pair of drive sprockets 148 keyed to a drive shaft 149. These chains also pass over a pair of rear idler sprockets 150. Drive to the shaft 149 is imparted by a sprocket 151 keyed thereto which is in turn driven from an endless drive chain 152 from a drive sprocket 153 keyed to the drive shaft 132. Thus, the movement of the transfer conveyor 42 and the intermediate carrier loading conveyor 43 is synchronized with the movement of the feed fingers 115, 116.

*Operation of feeder mechanism*

The carriers 19 are stored on edge in the magazine 46 and are fed through the magazine by gravity until their movement is arrested by engagement with the vertically movable separator spade 61. To feed a carrier from the magazine, the separator spade 61 is moved downwardly from the position illustrated in FIGURE 5. This downward movement is effected by rotational movement of the cam 111 which causes the cam follower 109 to move downwardly within the trackway 110, carrying with it the control rod 107 which results in pivoting movement of the link 104 and rotational movement of the shaft 103 to which the link 104 is nonrotatably secured. Rotational movement of the shaft 103 results in arcuate movement of the spade 61 with the result that the spade 61 moves downwardly from the position illustrated in FIGURE 5 from a blocking position in front of the first carrier in the magazine. Simultaneously with the downward movement of the separator spade 61, the suction cups 60 are rotated about the shaft 82 as a consequence of the movement of the cam follower 88 in the cam track 89 of cam 90. Movement of the cam follower 88 imparts axial movement to the connection rod 86 which results in pivoting movement of the connecting link 83 and the attached shaft 82 to which the suction cup carrying brackets 81 are secured. Oscillatory movement of the brackets 81 causes the three suction cups 60 to be moved into engagement with the three lowermost pockets 23 of the first carrier 19 in the magazine. Immediately prior to engagement of the suction cups 60 with the pockets 23 of the carrier 19, a vacuum is applied to the suction cups as a consequence of rotational movement of the shaft 132 and the connected control valve 135. Upon engagement of the suction cups 60 with the pockets 23 of the carrier, the three lower pockets are deformed as illustrated in FIGURE 6 so that the suction cup engaged pockets are bowed into a concave configuration. This results in the chime receiving sections 25 of the pockets being pulled from their nested condition within the pocket of the next adjacent carrier so that upon forward movement of the suction cups, the first carrier in the magazine is bowed about its longitudinal center line into the position illustrated in FIGURE 7. As soon as the carrier has been moved into this flexed condition and the lower half of the first carrier has been pulled away from the second carrier in the magazine by the suction cups, the spade 61 starts its upward movement as a consequence of rotational movement of the shaft 91 and the connected spade control cam 111. As the spade 61 enters between the first and second carrier in the magazine it forces its way upwardly between the two causing the second and all of the following carriers in the magazine to move rearwardly while simultaneously forcing the first carrier forwardly. The spade thus forces the top half of the first carrier out of its nested condition within the top half of the second carrier. At the upper end of its stroke, the spade will have completely forced the first carrier in the magazine away from and out of engagement with the next following carrier of the magazine.

Just prior to the arrival of the spade 61 at the upper end of its stroke, the valve 135 opens the suction cups to atmospheric pressure and their forward movement is continued until the cups are out of engagement with the first carrier in the magazine. Therefore, at the top of the stroke of the spade 61, the vacuum cups 60 are completely disengaged from the first carrier in the magazine.

When the spade 61 reaches the top of its stroke, the feed fingers enter the two finger holes 22 of the carrier and, upon continued rotation, push the separated first carrier downwardly from the magazine. Continued rotation of the fingers about the shaft 132 results in the carrier being deposited between the lower pair of guide rails 47, 48 and the upper pair of rails 67, 68. As the carrier fingers pass the vertical position, they become disengaged from the carrier which is left deposited upon the lower guide rails 47, 48. As thus deposited, the carrier is in a position to be engaged along its trailing edge by the lugs 130 of the transfer conveyor 42. These lugs 130 then push the carrier forwardly along the support rails into the path of the lugs 147 of the loading conveyor 43. This latter conveyor 43 then pushes the carrier forwardly into a carrier platen 44. As soon as the carrier has been placed in the carrier platen 44, it is securely clamped therein by the clamping mechanism which is completely disclosed in application Ser. No. 389,972, and therefore has not been disclosed in detail in this application. The conveyor 45 then transports the carriers around the sprocket 49 and in so doing turns the carrier upright so that the pockets face downwardly and are aligned with a group of six cans 20 conveyed on the lower flight 32.

The carrier is then brought into pressure engagement with the cans and, while pressure engagement between the tops six cans and the six pockets of a carrier is maintained, the bottoms of the cans are wobbled so as to tilt the tops of the cans relative to the planes of configuration of the carrier pockets. This oscillation causes the chimes of the cans to be progressively inserted into the chime receiving section 25 of the carrier. Once inserted into the pockets, the cans are suspended from the carrier as they are transported across an open gap 50 to the discharge conveyor 36 upon which the cans are placed and the carrier released from the platen conveyor.

Since the invention of this application is in the carrier feeder mechanism rather than in the packaging portion of the machine, the packaging portion has not been described in detail. For a complete disclosure of the packaging portion of the machine and the method of packaging, reference may be made to the above identified application.

While only a single preferred embodiment of the method and the apparatus for practicing my invention has been described herein, those skilled in the arts to which this invention pertains will readily appreciate numerous changes and modifications which may be made without departing from the spirit of my invention. Therefore, I do not intend to be limited except by the scope of the appended claims.

Having described my invention I claim:

1. A feeder for sequentially feeding generally planar carriers onto a conveyor, each of said carriers being made from plastic material and provided with a plurality of pockets adapted to receive and embracingly engage portions of can side walls in the vicinity of the can chimes such that the cans may be transported in and suspended from the carrier, said feeder comprising
 a magazine for storing said carriers in stacked relation with the pockets of each carrier nested within the pockets of the next adjacent carrier,
 a plurality of suction cups, each of said cups being movable into engagement with a pocket defining portion of the first carrier in the magazine,
 means for applying a vacuum to said cups when engaged with said first carrier and for maintaining said vacuum to said cups as said cups are moved away from said magazine to at least partially remove the first carrier from engagement with the following carrier in the magazine,
 a separator plate movable between the first carrier in the magazine and the carrier immediately behind said first carrier,
 means for disengaging said first carrier from said suction cups after said first carrier has been at least partially removed from nested engagement with the the following carrier in the magazine, and
 movable ejection fingers engageable with said first carrier after it has been released by said suction cups for moving said first carrier away from said magazine.

2. A feeder for sequentially feeding generally planar carriers onto a conveyor, each of said carriers being made from plastic material and provided with a plurality of rows of pockets adapted to receive and embracingly engage portions of can side walls in the vicinity of the can chimes such that the cans may be transported in and suspended from the carrier, said feeder comprising
 a magazine for storing said carriers in stacked relation in which the pockets of the carriers are nested within the pockets of adjacent carriers,
 a plurality of suction cups arranged in a row, each of said cups being movable into engagement with a pocket of a row of pockets of the first carrier in the magazine,
 means for applying a vacuum to said cups so as to bow said suction cup engaged pockets of said first carrier inwardly into a concave configuration,
 means for moving said suction cups away from said magazine while said vacuum is maintained to said cups so as to move said row of suction cup engaged pockets of said first carrier away from the corresponding pockets of the next adjacent carrier and define a gap therebetween,
 a separator plate movable into the gap between the first carrier in the magazine and the carrier immediately behind said first carrier so as to separate said first carrier from the next adjacent carrier,
 means for disengaging said first carrier from said suction cups after said first carrier has been at least partially removed from nested engagement with the following carrier in the magazine, and
 at least one movable extractor finger engageable with said first carrier after it has been released by said suction cups for moving said first carrier away from said magazine.

3. The feeder of claim 2 wherein said means for disengaging the first carrier from the suction cups comprises a valve operable to open said suction cups to atmospheric pressure.

4. The feeder of claim 2 wherein the means for moving the first carrier away from the magazine comprises at least one movable extractor finger engageable within a finger hole of the carrier.

5. The feeder of claim 2 wherein the means for moving said suction cups comprises a cam and cam follower connected through a mechanical linkage system to said suction cups.

6. The feeder of claim 5 wherein the movement of said separator plate is controlled by a cam and cam followed mechanically interconnected with said separator plate.

7. The method of feeding generally planar carriers from a magazine, each of said carriers being made from plastic material and provided with a plurality of pockets adapted to receive and embracingly engage portions of can side walls in the vicinity of the can chimes such that the cans may be transported in and suspended from the carrier, each of said carriers having at least one finger hole therein, said method comprising
 storing said carriers in a magazine in stacked relation with the pockets of the carriers nested within the pockets of the next adjacent carrier in the stack,
 engaging at least one pocket of the first carrier in the stack with a suction cup,
 applying a vacuum to said suction cup so as to bow the center portion of the suction cup engaged pocket inwardly away from the pocket within which it is nested in the stack,
 moving said suction cup away from said magazine while maintaining said vacuum to said cup so as to move at least a portion of the first carrier in the stack away from the next adjacent carrier so as to define a gap therebetween, inserting a separator into the gap between said first carrier and the next adjacent carrier, releasing the vacuum to said suction cup after insertion of said separator, and engaging the finger hole of said first carrier after release of said vacuum and pushing it away from said magazine.

References Cited

UNITED STATES PATENTS

| | | | |
|---|---|---|---|
| 1,089,274 | 3/1914 | Von Gazenhofen | 214—8.5 |
| 1,768,586 | 7/1930 | Farley | 271—12 |
| 2,218,484 | 10/1940 | Schneider | 271—12 |
| 2,554,320 | 5/1951 | Battey | 271—14 |

ANDRES H. NIELSEN, *Primary Examiner.*